United States Patent Office 3,245,880
Patented Apr. 12, 1966

3,245,880
NUCLEAR REACTORS OPERATING WITH SUBSTANTIALLY ISOTROPIC GRAPHITIZED BODIES
Samuel W. Martin, deceased, late of Oak Park, Ill., by Beverly Martin, executrix, Oak Park, Ill., Frederick L. Shea, Jr., Arlington Heights, Ill., and Leslie H. Juel, Lewiston, N.Y., assignors to Great Lakes Carbon Corporation, New York, N.Y., a corporation of Delaware
No Drawing. Filed Mar. 18, 1963, Ser. No. 266,088
20 Claims. (Cl. 176—41)

This invention relates to graphite products or bodies which are outstandingly useful in nuclear reactors as moderators or reflectors.

The graphite products according to the invention are very suitable for use in nuclear reactors in which the fissionable material e.g., uranium oxide or uranium carbide, or plutonium, or a fertile material and the moderating graphite are arranged in the reaction chamber and the heat generated therein is removed.

The graphite products prepared according to the invention may not only be used as a moderator right in the reaction zone as containers for fuel elements, or fuel elements themselves, but also as materials for a reflector mantle surrounding the reaction zone in nuclear reactors and serving to reflect some of the neutrons leaving the reaction zone. In any case the graphite bodies may be said to be in the "flux zone" of said nuclear reactors since they are contacted by or acted upon by the neutrons.

In these, and other possible instances, it is desirable to employ the graphite bodies in the form of plates, blocks, or tubes, or spheres typically ½ inch in diameter or larger or in the form of other shaped pieces, viz. as what may be termed as "massive structural" bodies, rather than small particles or powders.

Such shaped pieces are made by pressing or molding or shaping suitable carbonaceous material into the desired size and shape, followed by baking and graphitizing procedures. The pressing or shaping of the carbonaceous material is sometimes carried out while or after it is heated, but may, depending upon the starting materials being employed, also sometimes be carried out at room temperature. A plasticizing agent for the carbonaceous material will typically, but not invariably, be mixed with it before it is heat treated, formed and graphitized.

Several methods for making the graphitized bodies may be employed and will be described hereinafter, but in all instances the formed and graphitized bodies to be used in nuclear reactors in accordance with the present invention are made in such a manner that the arrangement of crystallites in the graphitized bodies is in a highly disordered, unoriented, state. This condition is manifested by the isotropy in the properties of the finished piece. The carbonaceous materials employed are preferably also substantially isotropic on a microscale—either substantially isotropic to begin with, or capable of being made substantially isotropic by techniques described herein. The disordered arrangement of the crystallites in the carbonaceous materials can be determined by X-ray diffraction and magnetic techniques and is manifested in the graphitized bodies by high coefficients of thermal expansion.

It is a finding of this invention that shaped and graphitized bodies characterized by such a disordered, unoriented crystallite arrangement and prepared by using such designated starting materials and process techniques, as are described in more detail hereinafter, are very suitable when used in nuclear reactors, particularly at temperatures in excess of 500° C. in high temperature nuclear reactors, and offer several advantages (most of which accrue from their dimensional stability) over the employment in the same environment of graphite bodies prepared from different starting materials, or employing other techniques.

Sources of suitable carbonaceous materials which may be employed in the present invention are the "semi-cokes," or "raw cokes" or "green cokes" of petroleum or coal tar origin which are produced in massive form and which have a volatile matter content of about 8–20% and which are also capable of softening when heated to temperatures between about 400° and 550° C. Of these the raw petroleum cokes are preferable and most suitable.

The "raw petroleum cokes" which are employed in the preparation of the graphite bodies which are the subject of this invention result from the thermal cracking and polymerization of heavy petroleum residues such as reduced or topped crudes, thermally or catalytically cracked residuums, etc. The coking is normally conducted in a vertical cylindrical drum such as those manufactured by Kellogg, Lummus and Foster Wheeler Companies. The heavy hydrocarbons are admitted into the drum at a temperature between 875° and 950° F. and are permitted to soak and carbonize until the drum is nearly filled with a solid coke. This material is removed from the drum by various decoking methods known to the art. Petroleum cokes having a volatile matter content averaging from about 8 to about 20% by weight and which are made in such "delayed cokers" may typically be employed in the present invention.

The volatile matter being discussed here is determined by ASTM method D271–48 modified for "sparking fuels" and is exclusive of the moisture and free oil which would be removed by heating to temperatures of 400–500° F. Volatile matter is determined in a platinum crucible in an electrically heated furnace maintained at temperatures of 1742° F.±36° F. A one gram sample of dry —60 mesh coke is preheated at temperatures below 1742° F. and then kept at a temperature of 1742° F. ±36° F. for 6 minutes and the resulting weight-loss is termed volatile matter.

The graphitized bodies may be prepared in several ways. Raw petroleum coke may be placed in a mold, heated to an elevated temperature between about 250° C. and about 450° C., and then pressed to the desired shape, while at this raised temperature and while in the mold, using a pressure of at least 1000 p.s.i. The temperatures employed and duration of same, and the pressures employed are variable, depending in part upon the size of the body being produced, the volatile matter of the raw petroleum coke particles being employed, the strength and density desired in the final product and the baking and graphitizing rates and conditions to be employed after the body is formed. Care is taken generally, however, to apply the pressure to the particles while they are still capable of "autogeneous" bonding, viz. capable of forming a strong, cohesive, internal bond without the addition of an extraneous binder such as pitch. Sufficient heat and pressure is employed in any case, however, to exert strong, and marked forces upon the particles being processed, sufficient to disrupt or break down most of the cleavage planes present in the starting raw petroleum coke and to result in a disordered arrangement of the crystallites.

Another way of preparing suitable graphitized bodies is to first thoroughly mix petroleum coke with a plasticizing agent, such as in a mix-muller for an extended period of time, and then form or mold this mixture into the desired shape, and then bake and graphitize the formed mixture, utilizing conventional baking and graphitizing techniques. Suitable substances for plasticizers include coal tar oils, coal tar pitches, wood tar pitch, anthracene oil, heavy wood tar oils and pitches, heavy lignite tar oils and pitches, phenanthrene, diphenyl, anthracene, and the like.

Another way of preparing suitable graphitized bodies from raw petroleum coke is to follow the foregoing procedure of thoroughly mixing the coke with a plasticizing agent and then heat treating same, optionally either in the form discharged from the mixer or as a briquetted mix or in other forms, etc., and then pulverizing the formed heat treated bodies if bodies have been formed. These techniques provide aggregate carbonaceous particles in which the crystallites are highly disordered and unoriented and which are also substantially isotropic.

These particles are then mixed with a carbonaceous bonding agent and the mixture then formed, baked, and graphitized according to conventional procedures. Heat treating temperatures employed in heating the plasticized raw petroleum coke particles, which as aforesaid may either be unformed, or formed into preliminary bodies which are later pulverized, may vary from about 600° C. to about 3000° C. The heat treated particles are then mixed with from about 20% to about 40% of a conventional carbonaceous binder such as pitch, and then baked and graphitized, following conventional techniques. In some instances, minor amounts of other carbonaceous materials such as carbon black or thermax may also be included in this mixture or in the making of the bodies of this invention.

It is important, in order to obtain the benefits of this invention, that the graphitizing step be carried out on the raw coke particles either (a) after the particles have been heat treated under mechanical pressure; or (b) after the particles have been thoroughly mixed with a plasticizer; or (c) after the crystallite arrangement of the particles has been disordered in some other suitable manner. If the raw coke particles are calcined or graphitized before any of these alternatives, then graphitized bodies prepared from such particles and a binder are incapable of, or do not result in, the achievement or production of graphitized bodies in accordance with this invention, which are particularly well suited for use in nuclear reactors.

The findings of this invention will become clearer after a consideration of the following examples.

EXAMPLE 1

One hundred parts of raw petroleum coke flour (50% minus 200 mesh—Tyler) and having a volatile matter content of 12% were mixed in a mix-muller at 95° C. for about 10 minutes with 12 parts of creosote oil plasticizing agent and the mixture placed in a cylindrical mold and shaped at 40° C. under 2000 p.s.i. pressure into a cylinder 8 inches in diameter and 8 inches long.

The formed body was then placed in a baking furnace, surrounded by packing material, and heated to a temperature of 950° C. over a period of 10 days. After cooling, the baked body was placed in a graphitizing furnace and heated to a temperature in excess of 2500° C.

The baked and graphitized body prepared in the foregoing manner, which of course had shrunk while being baked and graphitized was about 6 inches long and about 6 inches in diameter. The coefficients of thermal expansion of this body (or of the bodies of other examples) in the X, Y and Z directions were determined by cutting specimens parallel to the molding (or extrusion) force (X direction) and in two directions at 90° to each other in a plane perpendicular to the molding (or extrusion) force (Y and Z directions). These respective coefficients of thermal expansion were:

X—$50 \times 10^{-7}$ inches/inch/° C. or inch/inch/° C.
Y—$43 \times 10^{-7}$ inches/inch/° C.
Z—$44 \times 10^{-7}$ inches/inch/° C.

The values set forth in this example and for the examples in the table following are the mean coefficients of thermal expansion measured over the temperature range of 20° C. to 100° C.

Specimens from this sample were inserted in a nuclear reactor to test their dimensional stability under nuclear irradiation. The specimens were irradiated at a temperature of about 650° C. and each subjected to a total exposure of 1780 mwd./a.t. [(megawatt days per adjacent ton cf. "Nuclear Graphite," published by Academic Press, 1962, Chapter Eight on Radiation Techniques Employed)]. Their dimensional changes were then measured to determine the precent changes in the directions parallel and transverse to the direction of the molding force. Following are the results:

Direction: Average percent length change
Parallel _____ —0.009±0.004
Transverse _____ —0.006±0.005

This example shows that graphitized bodies, prepared from raw petroleum coke which has been thoroughly plasticized before being baked and graphitized, have very good dimensional stability and undergo very little dimensional change in any direction during irradiation.

The testing procedures of Example 1 were repeated, but the compositions employed in making the graphitized bodies, or the procedures employed in making same, were varied. Table I sets forth the results of these tests as well as additional data on the materials or procedures employed in making the bodies.

*Table I.—Dimensional changes after 1780 mwd/at exposure at 650° C.*

A. GRAPHITE BODIES MADE FROM CARBONACEOUS MATERIAL WHOSE CRYSTALLITE ARRANGEMENT HAS BEEN ALTERED AND RENDERED SUBSTANTIALLY ISOTROPIC BY PROCEDURES DESCRIBED HEREIN

| Example | Average percent change in length | | Sample and how prepared | Coefficient of thermal expansion, inches/inch/° C.× $10^{-7}$ | | |
|---|---|---|---|---|---|---|
| | Parallel | Transverse | | X Direction | Y Direction | Z Direction |
| 2 | +0.008±0.005 | +0.006±0.005 | Ten parts of coal tar base plasticizer and 100 parts of raw pet. coke (50%, —200 mesh) and having a V.M. of 15% were mix-mulled for 12 min. at about 100° C.; the mix was then calcined to a temp. of 1250° C. within 6 hrs.; it was then cooled and milled to 50%, —200 mesh; 100 parts of this aggregate were then mixed with 30 parts of pitch binder and molded into a cylindrical shape, at 90° C. and 2500 p.s.i.; the formed piece was then baked and graphitized using conventional procedures. | 47 | 45 | 43 |
| 3 | +0.010±0.003 | +0.008±0.005 | A batch of raw pet. coke (50%. —200 mesh) and having a V.M. of 16% was pre-heated to 375° C. and then formed into briquets under pressures of 2000 p.s.i.; the briquets were heated to 1250° C. and crushed and milled to flour; this flour was then processed in the same manner as the aggregate of Example 2. | 48 | 43 | 44 |
| 4 | +.005±0.004 | +0.006±0.006 | A graphite body prepared according to Example 1 was impregnated with coal tar pitch and was rebaked and graph. | 52 | 44 | 45 |

Table I (Continued)
B. GRAPHITE BODIES MADE FROM ANISOTROPIC CARBONACEOUS MATERIAL

| Example | Average percent change in length | | Sample and how prepared | Coefficient of thermal expansion, inches/inch/° C.×10⁻⁷ | | |
|---|---|---|---|---|---|---|
| | Parallel | Transverse | | X Direction | Y Direction | Z Direction |
| 5 | +0.040±0.010 | +0.011±0.006 | 100 parts of highly anisotropic calcined needle coke flour (50%, −200 mesh) were thoroughly mixed with 34 parts of coal tar pitch binder and the mix was formed, baked and graphitized as in Example 2. | 18 | 10 | 11 |
| 6 | −0.065±0.008 | −0.030±0.005 | 100 parts of commercially available calcined pet. coke flour (50%, −200 mesh) were thoroughly mixed with 36 parts of coal tar pitch binder and the mix was formed by extrusion at 100° C. and 2500 p.s.i. and then baked and graphitized as in Example 2. | 15 | 25 | 23 |

Examples 2, 3 and 4 of the table, as well as Example 1, illustrate graphite bodies which are suitable for use in nuclear reactors, all of which bodies were made from or based upon a raw coke, the crystallite arrangement of which has been converted to a highly disordered and unoriented state by the procedures described herein.

Examples 5 and 6 illustrate the *anisotropic* properties of graphite bodies made by conventional techniques or from conventional starting materials and also the relative dimensional instability of such bodies under nuclear irradiation, as compared to bodies made according to the present invention.

The anisotropy of the bodies of Examples 5 and 6 is demonstrated by their relatively low coefficients of thermal expansion in all directions and the wide disparity or difference in same when measured in different directions.

On the other hand, the isotropy of the bodies of Examples 1–4, which have good dimensional stability under nuclear irradiation, is demonstrated by their high coefficients of thermal expansion (CTE's) and also by the uniformity of the CTE's measured in all X, Y and Z directions of the bodies.

Graphitized bodies derived from raw coke having coefficients of thermal expansion in any directions of at least $30 \times 10^{-7}$ inch/inch/° C. and in which the said coefficients in any direction do not differ by more than 25% are operative for bringing about improved dimensional stability or resistance to radiation damage in nuclear reactors. Such bodies with more perfect isotropy, however, are preferred, as for example bodies which have coefficients of thermal expansion in any direction of at least $40 \times 10^{-7}$ inch/inch/° C. and in which said CTE's do not differ in any direction by more than 20%.

Dimensional statbiliy of graphite bodies employed in nuclear reactors is important for several reasons. In many cases the mass of graphite in reactors is very large, with dimensions in excess of 30 or 40 feet, in which event a slight of even very slight percentage dimensional change results in a relatively great overall absolute change. Dimensional instability such as too much "growth" or "shrinkage" may also cause rupture of the graphite structural members, or break or bend the fuel elements or other component parts. Such phenomena can also cause breakage or jamming of parts and damage to the cooling system, control system, etc.

It is to be understood that the invention is not limited to the specific examples which have been offered merely as illustrative and that modifications may be made within the scope of the appended claims without departing from the spirit of the invention.

We claim:

1. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from uncalcined raw petroleum coke in which the crystallite arrangement has been rendered highly disordered and unoriented by the simultaneous application thereupon of heat and mechanical pressure, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

2. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a thoroughly mixed blend of from about 60% to about 92% of uncalcined raw petroleum coke and of from about 40% to about 8% of a plasticizing agent for said coke, which results in a disordered and unoriented crystallite arrangement, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

3. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated raw petroleum coke which has been plasticized before being heat treated to produce a disordered and unoriented crystallite arrangement, and from about 40% to about 20% of a carbonaceous binder, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

4. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated raw petroleum coke, in which the crystallite arrangement of the as-produced raw coke before being heat treated has been rendered highly disordered and unoriented by the simultaneous application thereupon of heat and mechanical pressure, and from about 40% to about 20% of a carbonaceous binder, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

5. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from uncalcined coke of coal tar origin, in which the crystallite arrangement has been rendered highly disordered and unoriented by the simultaneous application thereupon of heat and mechanical pressure, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

6. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a thoroughly mixed blend of from about 60% to about 92% by weight of uncalcined coke of coal tar origin, and from about 40% to about 8% of a plasticizing agent for said coke, which results in a disordered and unoriented crystallite arrangement, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

7. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated coke or coal tar origin which has been plasticized before being heat treated to produce a disordered and unoriented crystallite arrangement, and from about 40% to about 20% of a carbonaceous binder, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

8. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated coke or coal tar origin, in which the crystallite arrangement of the as-produced coal tar coke before being heat treated has been rendered highly disordered and unoriented by the simultaneous application thereupon of heat and mechanical pressure, and from about 40% to about 20% of a carbonaceous binder, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

9. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from uncalcined raw petroleum coke in which the crystallite arrangement has been rendered highly disordered and unoriented by the simultaneous application thereupon of heat and mechanical pressure, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

10. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a thoroughly mixed blend of from about 60% to about 92% by weight of uncalcined raw petroleum coke and of from about 40% to about 8% of a plasticizing agent for said coke, which results in a disordered and unoriented crystallite arrangement, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

11. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated raw petroleum coke which has been plasticized before being heat treated to produce a disordered and unoriented crystallite arrangement, and from about 40% to about 20% of a carbonaceous binder, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

12. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated raw petroleum coke, in which the crystallite arrangement of the as-produced raw coke before being heat treated has been rendered highly disordered and unoriented by the simultaneous application thereupon of heat and mechanical pressure, and from about 40% to about 20% of a carbonaceous binder, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

13. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from uncalcined coke of coal tar origin, in which the crystallite arrangement has been rendered highly disordered and unoriented by the simultaneous application thereupon of heat and mechanical pressure, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

14. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a thoroughly mixed blend of from about 60% to about 92% by weight of uncalcined coke of coal tar origin, and from about 40% to about 8% of a plasticizing agent for said coke, which results in a disordered and unoriented crystallite arrangement, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

15. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared substantially completely from a mixture of from about 60% to about 80% by weight of an aggregate made from heat treated coke of coal tar origin which has been plasticized before being heat treated to produce a disordered and unoriented crystallite arrangement, and from about 40% to about 20% of a carbonaceous binder, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

16. In the process of operating a nuclear reactor, the steps comprising creating a nuclear reaction and thereby effecting a neutron flux, and moderating or reflecting the neutrons by placing in the path of said neutrons formed and graphitized, massive structural substantially isotropic bodies prepared substantially completely from a mixture of about 60% to about 80% by weight of an aggregate made from heat treated coke of coal tar origin, in which the crystallite arrangement of the as-produced coal tar coke before being heat treated has been rendered highly disordered and unoriented by the simultaneous application thereupon of heat and mechanical pressure, and from about 40% to about 20% of a carbonaceous binder, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

17. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared, using as the principal ingredient, petroleum and coal tar derived cokes, in which the crystallite arrangement of the as-produced raw coke has been rendered highly disordered and unoriented while said coke is in the raw state, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

18. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared, using as the principal ingredient, petroleum and coal tar derived cokes, in which the crystallite arrangement of the as-produced raw coke has been rendered highly disordered and unoriented while said coke is in the raw state, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

19. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared, using as the principal ingredient, petroleum and coal tar derived cokes, in which the crystallite arrangement of the as-produced raw coke has been rendered highly disordered and unoriented while said coke is in the raw state, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%, and said graphitized bodies being used in the nuclear reactor in such a manner that the bodies attain a temperature in excess of 500° C.

20. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies prepared, using as the principal ingredient, petroleum and coal tar derived cokes, in which the crystalline arrangement of the as-produced raw coke has been rendered highly disordered and unoriented while said coke is in the raw state, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%, and said graphitized bodies being used in the nuclear reactor in such a manner that the bodies attain a temperature in excess of 500° C.

References Cited by the Examiner

FOREIGN PATENTS 874,439    8/1954    Great Britain.

OTHER REFERENCES

American Ceramic Society Bulletin, vol. 36, No. 3, March 1957, pp. 101–104.

Nuclear Engineering, vol. 3, No. 32, November 1958, pp. 479–485.

Proceedings of Second United Nations International Conference on the Peaceful Uses of Atomic Energy, vol. 4, put out by the United Nations, 1958, pp. 263, 264, and 267.

REUBEN EPSTEIN, *Primary Examiner.*

CARL D. QUARFORTH, *Examiner.*